(12) United States Patent
Kanamori et al.

(10) Patent No.: US 6,474,587 B2
(45) Date of Patent: Nov. 5, 2002

(54) SEAT BELT RETRACTOR

(75) Inventors: Yasushi Kanamori, Tokyo (JP); Joji Mishina, Tokyo (JP); Masahiro Shiotani, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/782,273

(22) Filed: Feb. 14, 2001

(65) Prior Publication Data

US 2001/0023904 A1 Sep. 27, 2001

(30) Foreign Application Priority Data

Feb. 23, 2000 (JP) ........................................ 2000-046036

(51) Int. Cl.⁷ .............................................. B65H 75/48
(52) U.S. Cl. ...................................... 242/379.1; 280/805
(58) Field of Search ............................ 242/379.1, 379; 297/470, 471, 472; 280/805, 806

(56) References Cited

U.S. PATENT DOCUMENTS

| | | | |
|---|---|---|---|
| 4,796,918 A | 1/1989 | Mayer et al. | 280/806 |
| 5,722,611 A | 3/1998 | Schmid et al. | 242/376 |
| 5,820,058 A | 10/1998 | Hirzel et al. | 242/379.1 |
| 5,899,402 A | 5/1999 | Koning | 242/379.1 |
| 5,954,287 A * | 9/1999 | Hirase | 242/379.1 |
| 6,105,894 A | 8/2000 | Singer et al. | 242/379.1 |
| 6,131,843 A | 10/2000 | Singer et al. | 242/379.1 |
| 6,206,315 B1 | 3/2001 | Wier | 242/379.1 |
| 6,216,972 B1 * | 4/2001 | Rohrle | 242/379.1 |
| 6,256,848 B1 * | 7/2001 | McCulloch | |
| 6,299,091 B1 * | 10/2001 | Blackadder et al. | 242/379 |
| 6,336,606 B1 * | 1/2002 | Smithson et al. | 242/379.1 |

FOREIGN PATENT DOCUMENTS

| | | |
|---|---|---|
| DE | 3711537 | 11/1988 |
| DE | 195 28 115 | 2/1997 |
| DE | 298 10 005 | 10/1998 |
| JP | 2816332 | 8/1998 |
| JP | 2887120 | 12/1999 |

\* cited by examiner

Primary Examiner—William A. Rivera
(74) Attorney, Agent, or Firm—Foley & Lardner

(57) ABSTRACT

A seat belt retractor with a torsion bar which can receive a large torque and can be easily formed by forging is provided. A reel assembly of the seat belt retractor includes a reel, a torsion bar, and a locking member. A first connection part of the torsion bar non-rotatably couples with concavities of a locking base of the locking member. A second connection part non-rotatably couples with concavities of the reel. The outer peripheries of the connection parts and are torx-shaped having a plurality of concavities and convexities formed in a wave-shape. A ratio R1/R2 of the distance between the tops of the wave-shaped convexities of the connection parts and the axial center of the torsion bar (radius R1) to the distance between the bottoms of the concavities and the axial center of the torsion bar (radius R2) is set to 1.2 to 1.3.

5 Claims, 8 Drawing Sheets

SEAT BELT RETRACTOR

BACKGROUND

The present invention relates to seat belt retractors for spooling seat belts (webbings) for retaining passengers in seats of vehicles and the like. More specifically, it relates to a seat belt retractor which can transmit large torque and is provided with a torsion bar which can be easily formed by forging.

A seat belt device provided in a vehicle, such as an automobile, restrains a passenger from an abrupt movement caused by acceleration due to collision of the vehicle, thereby ensuring safety of the passenger. The seat belt device generally includes a webbing or belt, a retractor, a buckle, and the like. The retractor retracts the webbing by winding the webbing about a spool using a spring force. The retractor then locks the webbing from being pulled out from the spool when applied with an impact, thereby restraining the passenger. The buckle serves for making the webbing to fit the passenger's body, and is generally disposed at a side of the seat.

Conventionally, in the seat belt device, the webbing has been locked from being pulled out from the retractor in a collision, and the passenger's body has been restrained from moving forward by the locked webbing. However, a load would be applied to the passenger at the breast, etc., via the webbing, when the passenger is rapidly restrained from moving forward. It has been confirmed that the load applied to the passenger can be effectively reduced by drawing out the webbing by a given length while applying a predetermined resistance to the draw-out movement. That is, when restraining the passenger from moving, the webbing is preferably drawn out by a given length while being applied with a predetermined load in the opposite direction, thereby absorbing energy of collision applied to the passenger.

The structure for absorbing energy applied to the passenger is called an energy absorption "EA" structure.

A seat belt retractor which uses a torsion bar as the EA structure is known. In this type of seat belt retractor, a spool for spooling a webbing is non-rotatably connected to a relatively fine torsion bar at one end of the torsion bar. A locking structure to prevent the webbing from pulling out is connected to the other end of the torsion bar. Whereby, the rotation of the spool may be locked via the torsion bar. The force required to restrain the passenger from moving forward by inertia (i.e, a tensile force applied to the webbing) is transmitted to the torsion bar via the spool as a twisting force. When the twisting force exceeds a given value, twisting plastic-deformation occurs in the torsion bar. As a result, the locked spool gradually rotates, and the webbing is drawn out while being applied with a predetermined tensile force.

When the torsion bar twists to deform, a torque is applied to the connection part of the spool and the torsion bar in the twisting direction (peripheral direction). A conventional torsion bar used for transmitting the torque is shown in FIG. 7.

FIG. 7(A) is a perspective view of the torsion bar used in the known seat belt retractor. FIG. 7(B) is an expanded front view of a connection part of the torsion bar shown in FIG. 7(A).

In FIG. 7(A), a torsion bar 100 includes a cylindrical bar 102. Connection parts 104 and 106 individually having hexagonal peripheries are formed toward the ends of the bar 102. As shown in the drawing, the left connection part 104 is connected with a reel, and the right connection part 106 is connected with a reel-rotation locking structure. The torsion bar 100 is generally made of a steel wire (according to, for example, JIS Standard S15C) by forging. In this case, the diameters of a base material and a twisting part of the torsion bar 100 (shown by symbol X in FIG. 7(B)) are made the same so that the strength of the torsion bar equals the strength of the base material.

However, since the connection parts 104 and 106 of the torsion bar 100 are hexagonal, apexes 104a and 106a are in line contact along a line parallel to the longitudinal axis of the bar 100 with the reel and parts of the reel-rotation locking structure, respectively. Therefore, when a large twisting force is applied to the torsion bar 100, the apexes 104a and 106a in line contact are likely to be scraped away and to become smooth. Particularly, when the reel, a locking base, or the like, which are members at the concavity side to be coupled (i.e. the side configured to match connection part) with the connection parts, are made of a soft material, such as aluminum. In these situations the concavities of the reel and the like are likely to be scraped away by the twist of the torsion bar.

Another seat belt retractor is disclosed in, for example, Japanese Patent No. 2816332, in which the connection part of the torsion bar is formed in spline so that each convex part of the spline portion is in plane contact. Torsion bars having the spline portions are also disclosed in, for example, Japanese Patent No. 2887120, U.S. Pat. No. 5,899,402, and UK Patent No. GB2314535A. With these arrangements, the connection parts of the torsion bars are not likely to be scraped away and become smooth at the convexities even when the torsion bar twists to deform.

However, most suitable particular spline shapes are not described at all in the above publications.

On the other hand, JIS Standard (B1603) specifies a spline shape, as shown in FIG. 8. According to JIS Standard, the shape shown in the drawing is formed so that a ratio D1/D2 of a tip-circle diameter D1 to a root-circle diameter D2 exceeds 1.3.

However, the ratio D1/D2 according to JIS Standard is excessively large; therefore, the convexities become sharp. The convexities having that sharpness are difficult to form by forging in a simplified process.

Accordingly, an object of the present invention is to provide a seat belt retractor with a torsion bar which can receive a large torque transmitted and can be easily formed by forging.

SUMMARY OF THE INVENTION

In order to overcome the aforementioned disadvantages, a seat belt retractor according to the present invention comprises a reel for spooling a seat belt (webbing); a locking mechanism or structure for locking the rotation of the reel; and a torsion bar non-rotatably connected to the reel at one end of the torsion bar and non-rotatably connected to the structure for locking the rotation of the reel at the other end of the torsion bar. The ends (connection parts) of the torsion bar are torx-shaped having a plurality of concavities and convexities formed in a wave shape, and concavities formed in the reel and the structure for locking the rotation of the reel with which the reel and the structure for locking the rotation of the reel are coupled, respectively. A ratio R1/R2 of the distance between the tops of the convexities formed in the wave-shape and the axial center of the torsion bar (radius R1) to the distance between the bottoms of the concavities and the axial center of the torsion bar (radius R2) is set to 1.2 to 1.3.

Since the concavities of the connection parts of the torsion bar and the structure for locking the rotation of the reel are formed in a torx-shape, a torque twisting the torsion bar is transmitted via a plane contact. Therefore, the transmissible torque can be increased compared with the known seat belt retractor having connection parts formed in a hexagon. Moreover, the connection parts can be formed by forging more easily than those having the torx or spline shape specified according to JIS Standard by setting the value R1/R2 to 1.2 to 1.3.

The above forming by forging includes irregular-shape forming by applying a pressure to a bar at the ends thereof. In the torx-shape shown in FIG. 5, the difference in diameter from the bar (see thickness α shown in FIG. 5) can be set larger than in a hexagonal shape. Therefore, the ends of the torsion bar can be reliably and easily formed.

In the seat belt retractor according to the present invention, it is particularly advantageous to make a material (such as a locking base) to be used for the structure for locking the rotation of the reel, which comes in direct contact with the torsion bar, of aluminum, zinc, or magnesium.

A torque-transmitting part is likely to be scraped and become smooth, and the concavities and convexities thereof are likely to be removed when the torque-transmitting part is made of the above material which is softer than steel or cast iron. Therefore, it is more advantageous to use the material made of aluminum, zinc, or magnesium and formed in a torx-shape.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention are described further below with reference to the drawings.

Figure 4:
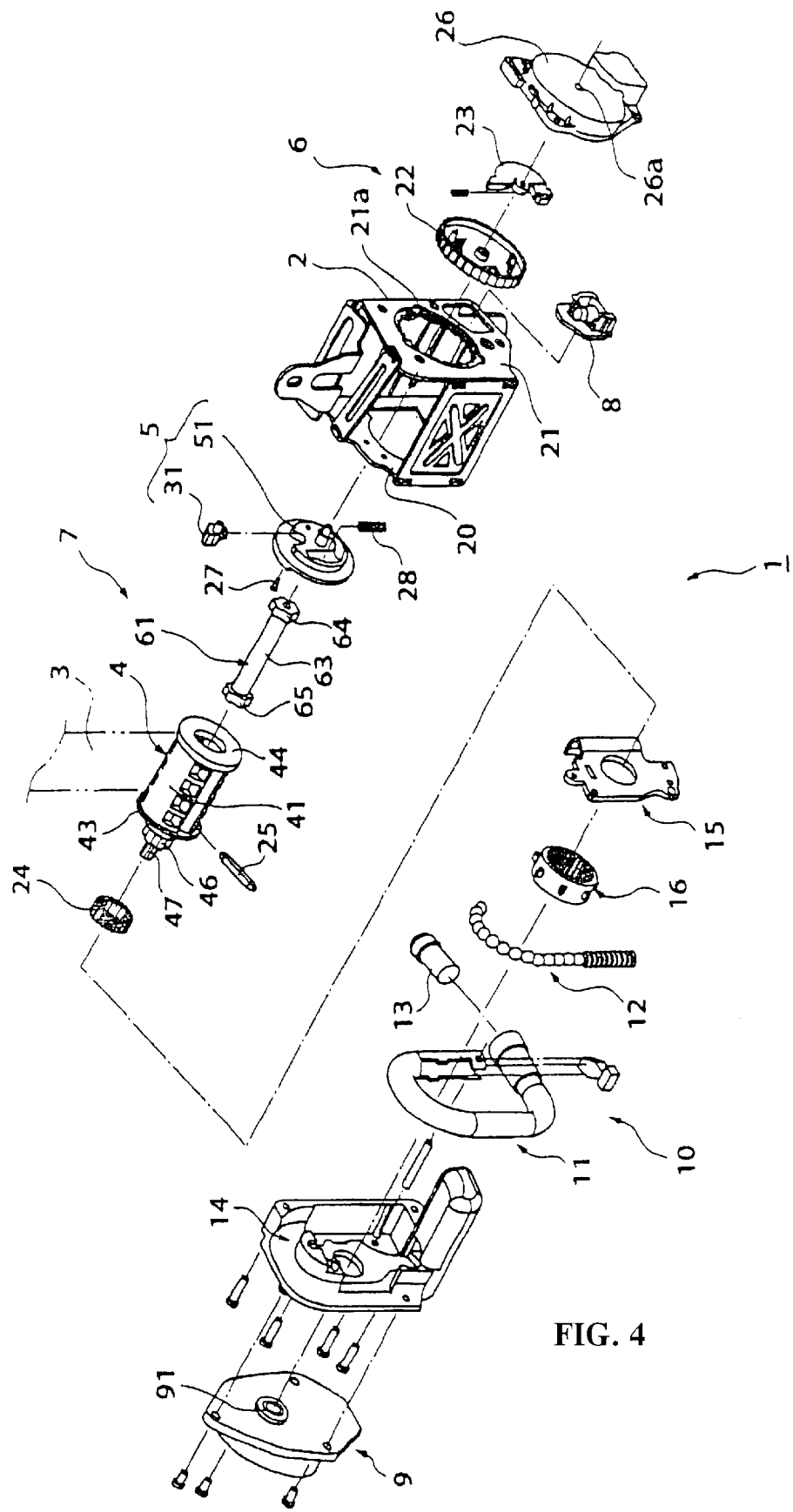
FIG. 4 is an exploded perspective view of the overall seat belt retractor according to the present invention.

As shown in FIG. 4, a seat belt retractor 1 is generally configured with the components described below. The retractor includes a frame 2 and a reel 4 for spooling a belt 3. A locking member 5 is provided at a side of the frame 2, for preventing the reel 4, when emergency lock operates, from rotating in a direction toward drawing out the belt. An emergency-locking structure 6 is provided for operating the locking member 5 when the vehicle collides.

The retractor further includes an EA structure 7 for regulating a load on the belt 3 to be applied thereto when the belt 3 is prevented by the operation of the locking member 5 from being drawn out.

A speed-reduction detecting member 8 is provided for detecting reduction of the vehicle speed. In addition, a return spring 9 is included for urging the reel 4 in the spooling direction. The retractor also includes a pretensioner 10 for quickly rotating the reel 4 in a direction toward spooling the belt.

The reel assembly includes the reel, the torsion bar, and the locking member), which are major components of the present invention. The reel assembly is described further below with reference to FIGS. 1 to 3. Parts, which are disclosed in, for example, Japanese Patent Application No. 11-372518, may be used as the other components.

Figure 1:
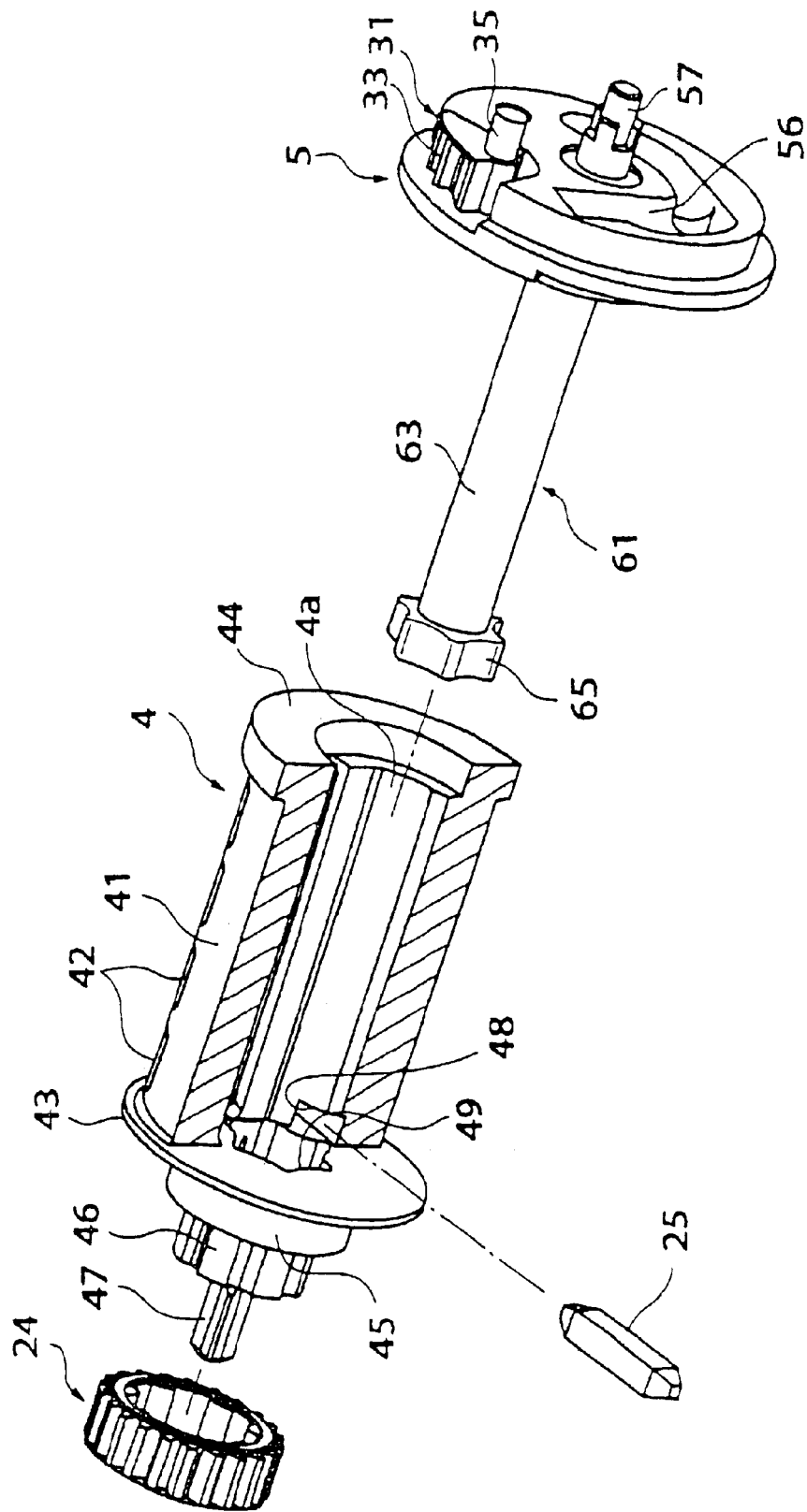
FIG. 1 is a perspective view of a reel assembly forming a seat belt retractor according to an embodiment of the present invention.

The reel 4 is made of a material, such as die-cast aluminum or zinc. As shown in FIGS. 1 and 3, the reel 4 includes a cylindrical belt-spooling part 41. A plurality of holes 42 are formed in the periphery of the belt-spooling part 41. The holes 42 serve for reducing the weight of the belt-spooling part 41. The belt-spooling part 41 includes flanges 43 and 44 formed at the ends thereof. The thickness of the flange 43 is smaller than that of the flange 44.

As shown in FIGS. 1 and 3, an outer shaft 45 is formed outside the flange 43 of the reel 4. A spline shaft 46 having an outer periphery formed in spline protrudes from the outside of the outer shaft 45. The spline shaft 46 is coupled with a pinion 24 of the pretensioner 10 (see FIG. 4). The spline shaft 46 is provided with a spring-urged shaft 47 protruding from the end of the spline shaft 46. When the seat belt retractor 1 is formed, the spline shaft 46 protrudes toward the outside of a sidewall 20 of the frame 2 shown in FIG. 4. The spring-urged shaft 47 is inserted into a bush shaft 91 of a return spring 9 shown in FIG. 4, whereby the spring-urged shaft 47 is urged by the return spring 9.

As shown in FIG. 1, concavities 49 having internal faces formed in a torx-shape are provided at centers of the flange 43 of the reel 4 and the outer shaft 45. The concavities 49 are coupled with a connection part 65 of a torsion bar 61 described below. A pin-mating hole 48 is formed in a part of the inner face of the reel 4 and in the vicinity of the concavities 49. The pin-mating hole 48 mates with a pin 25. The reel 4 is mounted with the torsion bar 61, is coupled with the connection part 65 at the concavities 49, and is provided with the pin 25 mating with the pin-mating hole 48 so that the torsion bar 61 is not removed from the reel 4. A hole 4a is formed in the flange 44 of the reel 4 at a center of the flange 44. The torsion bar 61 is inserted through the hole 4a.

Figures 2A, 2B:
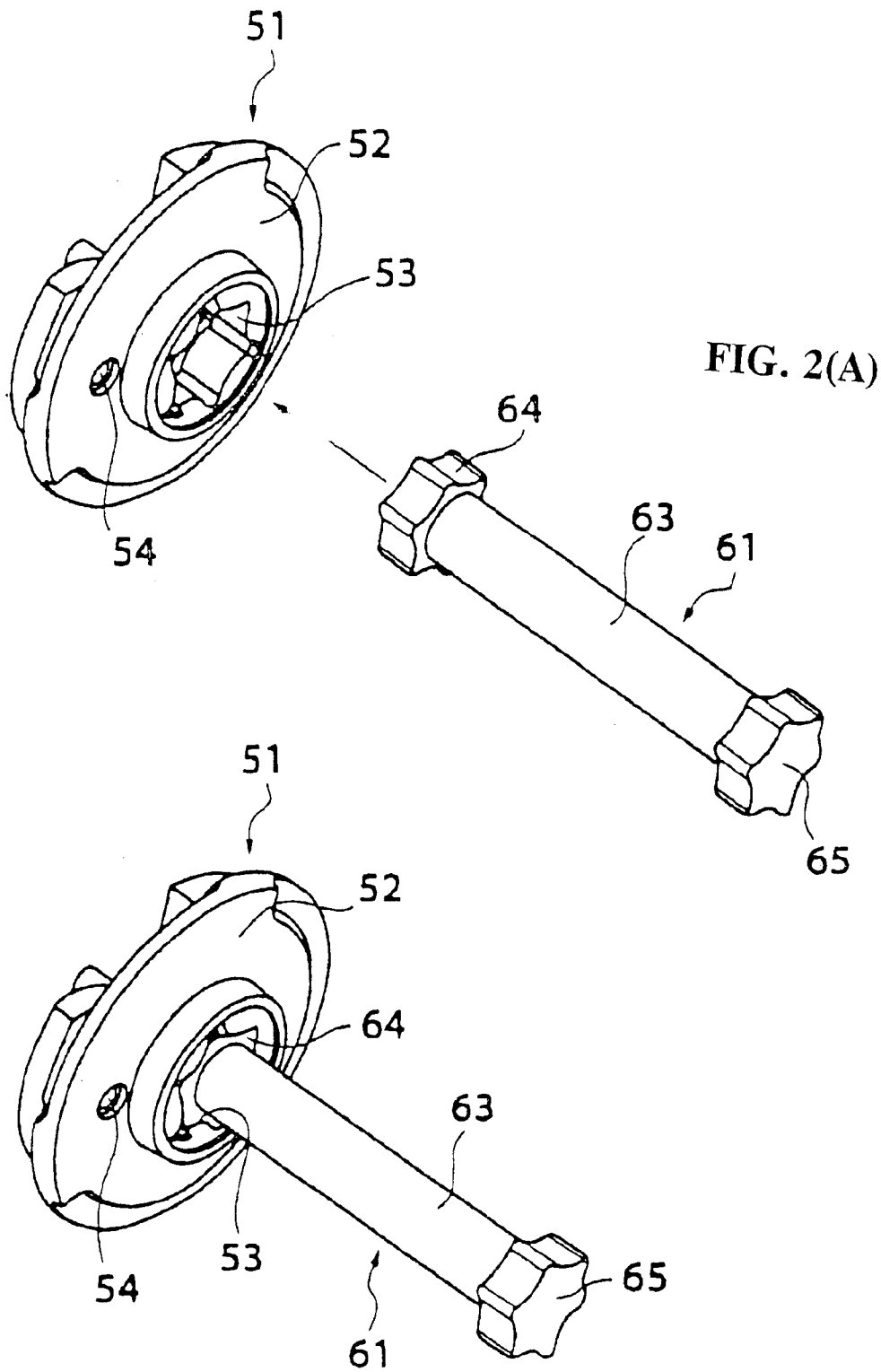
FIG. 2(A) is a perspective view of a locking base and a torsion bar before connected to each other so as to form the reel assembly shown in FIG. 1.
FIG. 2(B) is a perspective view of the locking base and the torsion bar connected to each other.
Figure 3A:
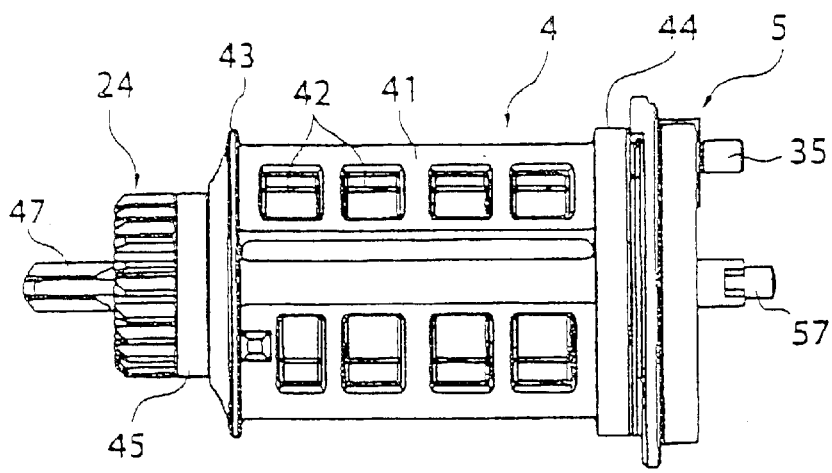
FIG. 3(A) is a side view of a spool assembly shown in FIG. 1.
Figure 3B:
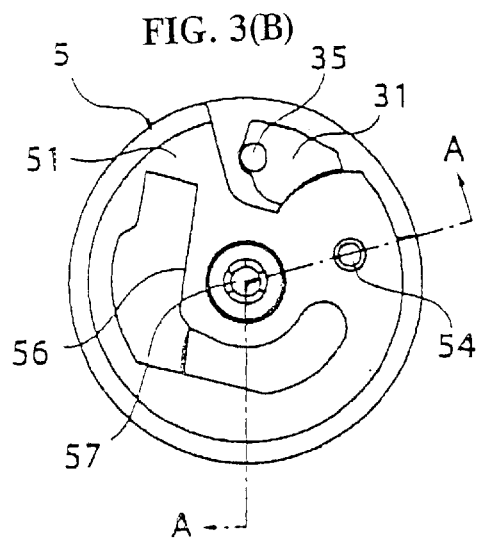
FIG. 3(B) is a front view from the right of the spool assembly shown in FIG. 3(A).
Figure 3C:
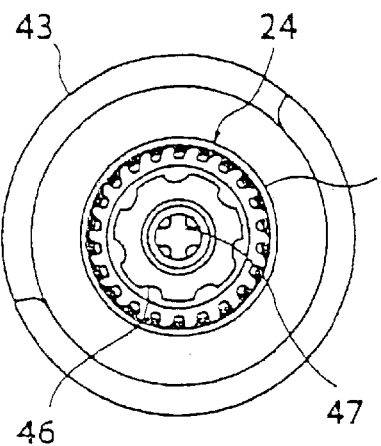
FIG. 3(C) is a front view from the left of the spool assembly shown in FIG. 3(A).
Figure 3D:
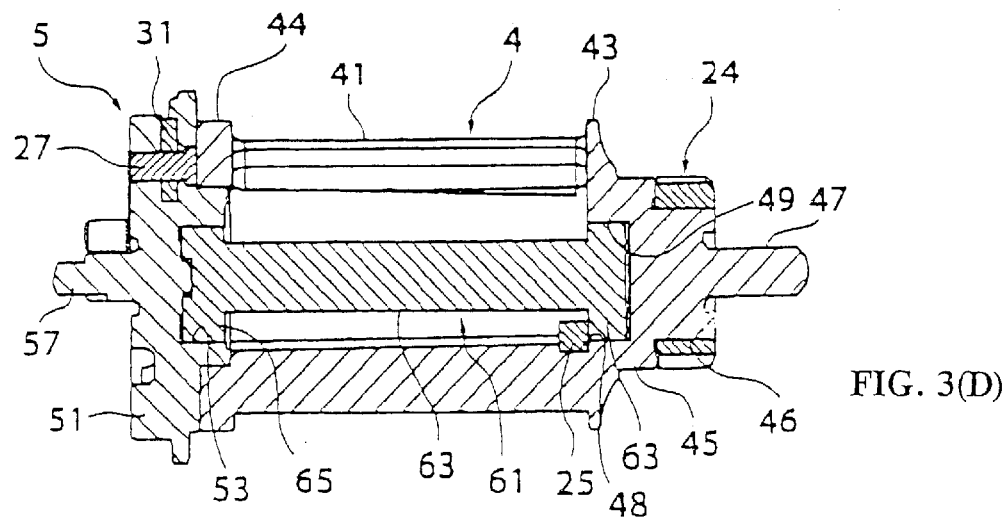
FIG. 3(D) is a sectional view, along line A—A, of the spool assembly shown in FIG. 3(B).
Figure 5:
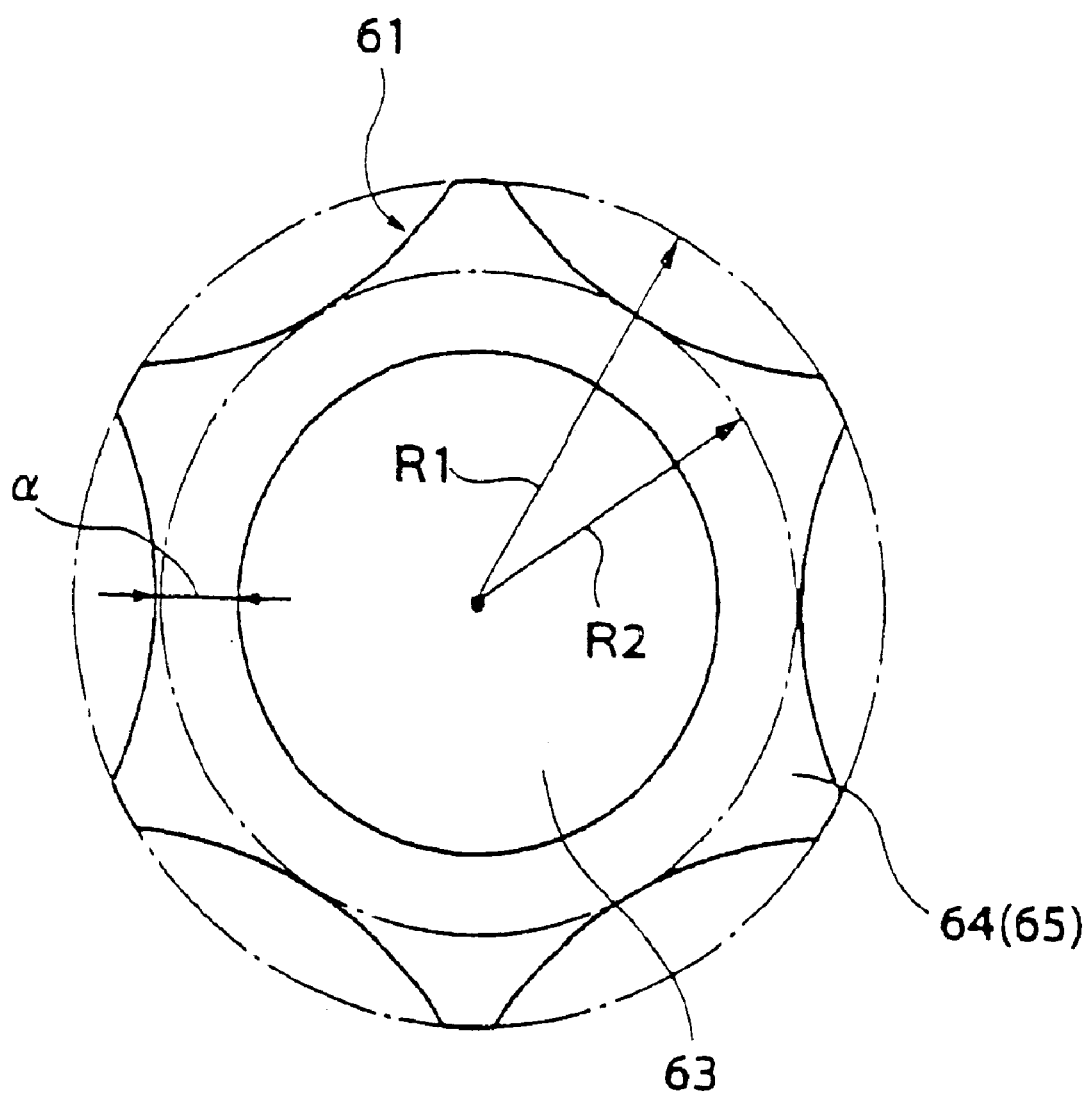
FIG. 5 is an expanded front view of a connection part of the torsion bar according to the present invention.

As shown in FIGS. 1 to 3, the torsion bar 61 includes a cylindrical bar 63 having a circular section. The bar 63 is provided with connection parts 64 and 65 individually formed at the ends of the bar 63. The connection part 64 is non-rotatably coupled with concavities 53 of a locking base 51 described below (see FIG. 2). The connection part 65 is non-rotatably coupled with the above described concavities 49 of the reel 4 (see FIG. 1). The peripheries of the connection parts 64 and 65 are individually formed in a torx-shape. The torx shape is shown in FIG. 5 and includes a plurality of concavities and convexities formed in a wave shape. A ratio R1/R2 of the distance between the tops of the wave-formed convexities of the connection part 64 or 65 and the axial center of the torsion bar 61 (radius R1) to the distance between the bottoms of the concavities and the axial center of the torsion bar 61 (radius R2) is set to a value of between 1.1 to 1.4. Preferably the ratio R1/R2 is set to a valve of 1.2 to 1.3.

Figures 6A, 6B, 6C, 6D:
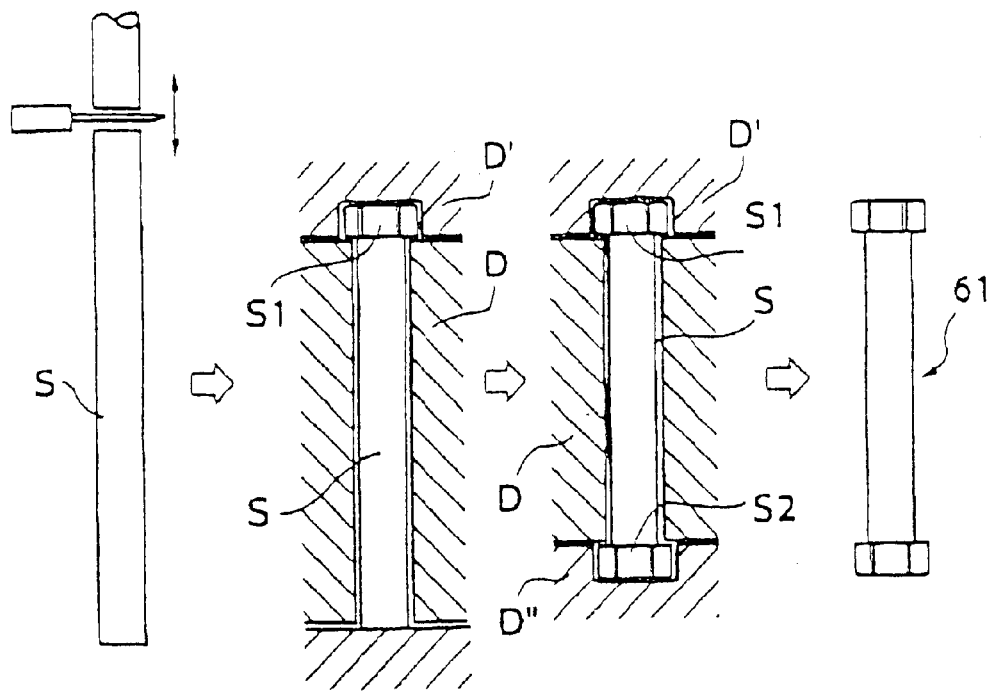
FIG. 6 is an illustration showing an example of a forging process of the torsion bar according to embodiments of the present invention.
Figure 7A:
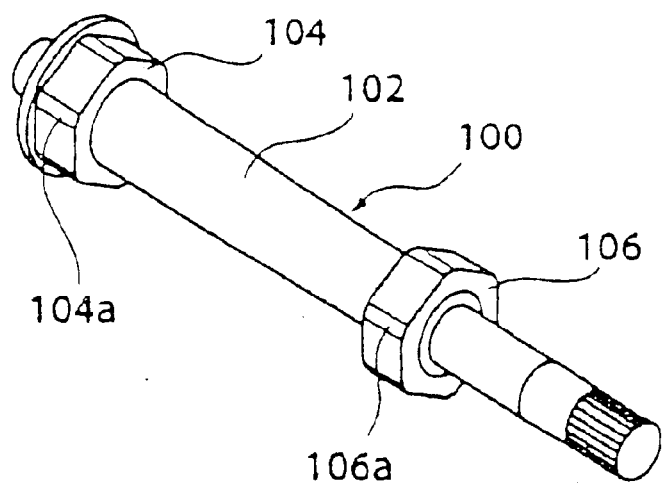
FIG. 7(A) is a perspective view of the torsion bar used in a known seat belt retractor.
Figure 7B:
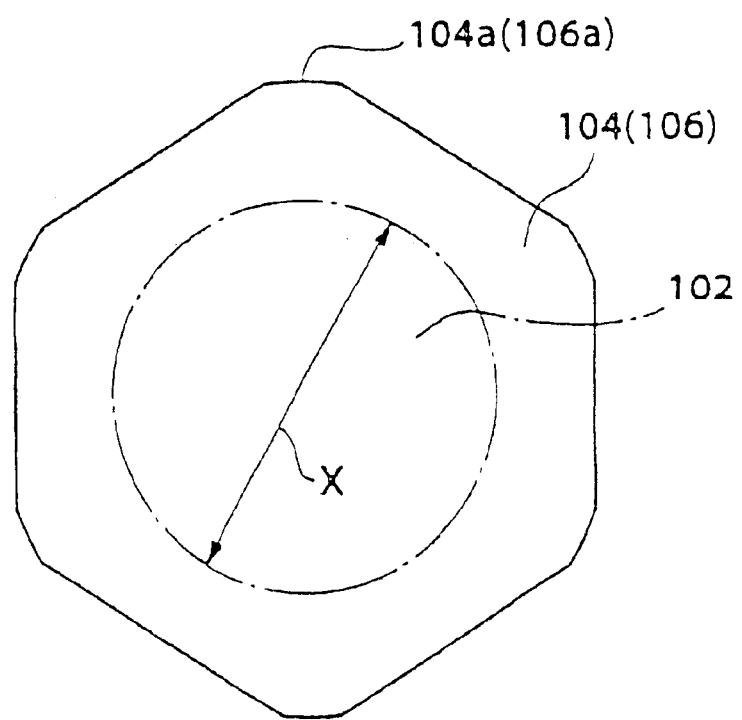
FIG. 7(B) is an expanded front view of the torsion bar shown in FIG. 7(A).

The torsion bar 61 is made by forging a round bar having a property of, for example, S15C (according to JIS Standard). The torsion bar 61 is formed by forging in a process such as shown in FIG. 6, for example.

The torsion bar forming process may include the following steps. First, a round bar S is cut at a predetermined length (FIG. 6(A)). Next, the round bar S is affixed at the side face thereof by a die D, and is deformed at the upper end thereof by an upper die D' (torque die), thereby forming an end S1 (FIG. 6(B)). In the same manner as the upper end of the bar, the lower end of the round bar S is deformed by a lower die D" (torque die), thereby forming an end S2 (FIG. 6(C)). Finally, the round bar is released from the dies, whereby formation of the torsion bar 61 is completed (FIG. 6(D)).

Figure 8:
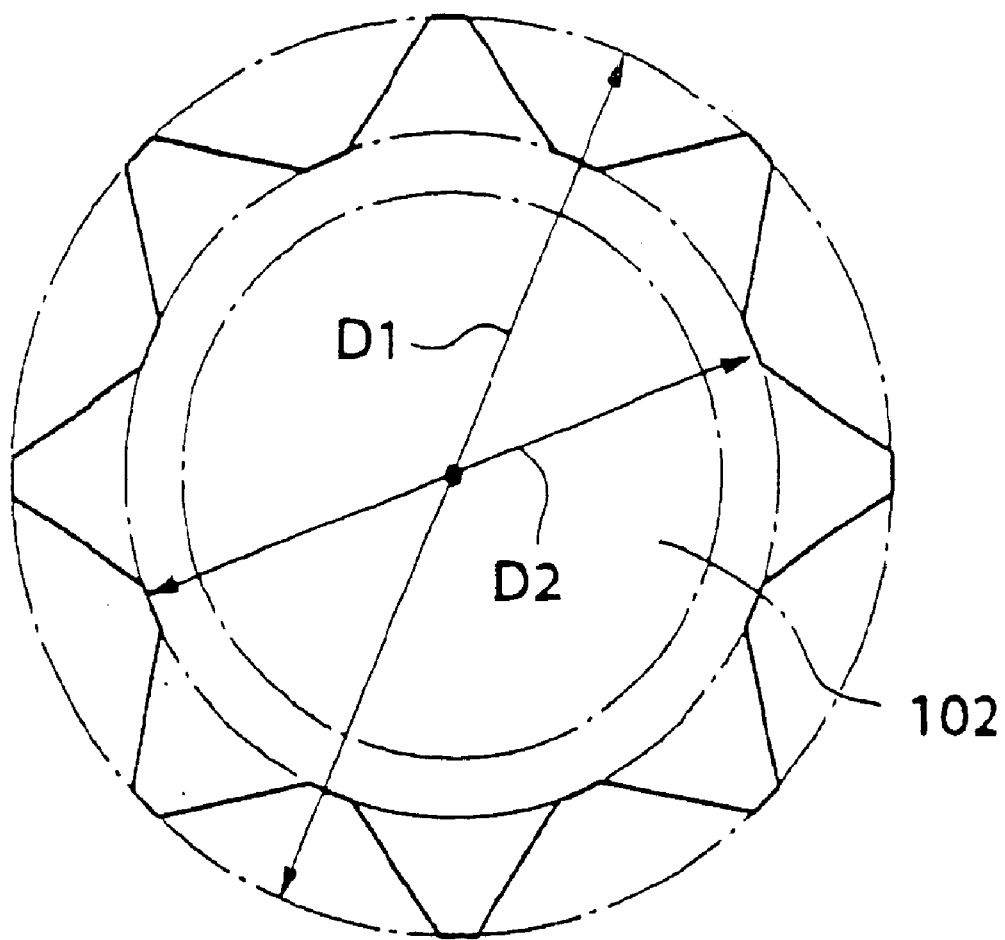
FIG. 8 is an expanded front view showing a torx-shape, according to JIS Standard, of the connection part of the torsion bar.

In the above process, by setting the value R1/R2 to 1.2 to 1.3, the torsion bar can be formed by forging more easily than the known spline material (see FIG. 8) specified according to JIS Standard. Using the torx-shape of the present invention, the difference in diameter from a round bar (thickness α shown in FIG. 5) can be set greater than in a hexagonal shape, whereby the ends of the torsion bar 61 can be reliably and easily formed.

The locking member 5 is described below. In FIGS. 1 to 3, the locking member 5 includes the locking base 51 and a pawl 31 made of a material, such as die-cast aluminum or zinc. The locking base 51 includes a circular disc 52 (see FIG. 2). The concavities 53 having inner faces formed in a torx-shape are formed at a center of a rear face (the visible side in FIG. 2) of the disc 52. As described above, the torsion bar 61 is non-rotatably coupled with the concavities 53 at the connection part 64 of the torsion bar 61. A through-hole 54 is formed in the disc 52, for rotatably supporting the pawl 31. A spring-supporting part 56 is provided at a front face (the visible side in FIG. 1) of the disc 52, for supporting a pawl spring 28 shown in FIG. 4 at one end of the pawl spring 28. A stepped shaft 57 protrudes from a center of the front face of the disc 52. When the seat belt retractor 1 is formed, the stepped shaft 57 is mounted with a lock gear 22 and a flywheel 23 of the emergency-locking structure 6 shown in FIG. 4. The stepped shaft 57 is inserted at an end thereof into a central hole 26a of a retainer housing 26 shown in FIG. 4.

The pawl 31 is rotatably mounted to the locking base 51 with a pin 27 (see FIG. 4) mating with the through-hole 54 of the locking base 51. The pawl 31 is provided at a tip thereof with a mating claw 33 capable of mating with internal teeth 21a of a sidewall 21 shown in FIG. 4. The pawl 31 is provided with a pawl pin 35 which is a protruding shaft. The pawl 31 transmits a reaction force applied thereto to the locking base 51 when the mating claw 33 of the pawl 31 mates with the internal tooth 21a, that is, the reaction force of the pawl 31 is supported by the locking base 51.

In FIG. 4, a pipe 11, balls 12, a gas generator 13, a cover 14, a plate 15, a ring gear 16, and the like form the pretensioner 10. A pretensioner disclosed in, for example, Japanese Patent Application No. 11-372518 (incorporated by reference herein) may be used as the pretensioner 10.

The operation of the EA structure of the seat belt retractor 1 having the above-described configuration is described further below. In a normal state of the vehicle, the locking member 5 and the pretensioner 10 do not operate, and the reel 4 is urged in the spooling direction by the return spring 9. When the belt 3 is drawn out, the reel 4 rotates in a direction toward drawing out the belt (webbing) while being urged in the spooling direction by the return spring 9.

When the vehicle collides, the pretensioner 10 operates and the torsion bar 61 is applied with a strong torque in the belt-spooling peripheral direction. The torque rotates the reel 4 via the connection part 65 of the torsion bar 61 and the concavities 49 of the reel 4. By this rotation, the belt 3 is spooled by a predetermined length. At substantially the same time, the locking member 5 is put into operation by the emergency-locking structure 6, thereby checking the rotation in the belt-drawing-out direction of the locking base 51.

At an early stage of the collision of the vehicle, the passenger's body moves as if it is thrown forward, whereby a strong force is applied to the belt 3 in the drawing-out direction. However, the locking base 51 cannot rotate in the belt-drawing-out direction due to the operation of the locking member 5. Therefore, the torsion bar 61 coupled with the concavities 53 of the locking base 51 at the connection part 64 of the torsion bar 61 cannot rotate, and the reel 4 coupled with the connection part 65 of the torsion bar 61 at the concavities 49 of the reel 4 cannot rotate.

As the force applied to the belt 3 increases and the rotational force applied to the reel 4 thereby increases, the torsion bar 61 is twisted and plastic-deformed at the bar 62 between the connection parts 64 and 65, and the reel 4 rotates in the belt-drawing-out direction while the reel 4 twists the torsion bar 61. The load applied on the passenger is absorbed by the torsion bar 61 being twisted.

According to the present invention, since the connection parts 64 and 65 of the torsion bar 61 and the concavities 49 and 53 of the reel 4 and the locking base 51, respectively, are formed in a torx-shape, the torque in the peripheral direction can be effectively transmitted via a plane contact, thereby increasing transmissible torque.

The priority application, Japanese Patent Application, Number 2000-046036, filed Feb. 23, 2000 is incorporated by reference herein in its entirety.

Given the disclosure of the present invention, one versed in the art would appreciate that there may be other embodiments and modifications within the scope and spirit of the invention. For example, as described above, a seat belt retractor can be provided with a torsion bar which can receive a large torque transmitted and can be easily formed by forging. Accordingly, all modifications attainable by one versed in the art from the present disclosure within the scope and spirit of the present invention are to be included as further embodiments of the present invention. The scope of the present invention is to be defined as set forth in the following claims.

We claim:

1. A seat belt retractor comprising:

a reel for spooling a seat belt;

a locking mechanism for locking the rotation of the reel; and a forged torsion bar having a first connection part non-rotatably connected to the reel at one end of the torsion bar and a second connection part non-rotatably connected to the locking mechanism at the other end of the torsion bar, wherein the first and second connection parts are torx-shaped having a plurality of concavities and convexities formed in a wave-shape, and wherein concavities are formed in the reel and the locking mechanism structure for locking the rotation of the reel are formed in a torx-shape corresponding to the shape of the connecting parts with which the reel and the structure for locking the rotation of the reel are respectively connected; and wherein a ratio R1/R2 of the distance between the tops of the convexities formed in the wave-shape and the axial center of the torsion bar (radius R1) to the distance between the bottoms of the concavities and the axial center of the torsion bar (radius R2) is between 1.1 and 1.3.

2. The seat belt retractor of claim 1, wherein the ration R1/R2 is between 1.2 and 1.3.

3. The seat belt retractor of claim 1, wherein the locking mechanism comprises aluminum at the location where torsion bar comes into direct contact with the locking mechanism.

4. The seat belt retractor of claim 1, wherein the locking mechanism comprises zinc at the location where torsion bar comes into direct contact with the locking mechanism.

5. The seat belt retractor of claim 1, wherein the locking mechanism comprises magnesium at the location where torsion bar comes into direct contact with the locking mechanism.

* * * * *